Jan. 9, 1968 R. E. BOWLING ETAL 3,363,183

SELF-CORRECTING CLOCK FOR A DATA TRANSMISSION SYSTEM

Filed July 13, 1965 2 Sheets-Sheet 1

INVENTORS
RAYMOND E. BOWLING
ORVILLE D. MONTGOMERY
THOMAS J. ROCHE

BY Charles P. Means

AGENT

Jan. 9, 1968 R. E. BOWLING ETAL 3,363,183

SELF-CORRECTING CLOCK FOR A DATA TRANSMISSION SYSTEM

Filed July 13, 1965 2 Sheets-Sheet 2

United States Patent Office 3,363,183
Patented Jan. 9, 1968

3,363,183

SELF-CORRECTING CLOCK FOR A DATA TRANSMISSION SYSTEM

Raymond E. Bowling, Vestal, Orville D. Montgomery, Endwell, and Thomas J. Roche, Johnson City, N.Y., assignors to International Business Machines Corporation, Armonk, N.Y., a corporation of New York Filed July 13, 1965, Ser. No. 471,631
7 Claims. (Cl. 328—63)

ABSTRACT OF THE DISCLOSURE

Self-correcting control apparatus comprising five interconnected triggers operating in a binary manner and functioning to keep the receiving terminal of a data transmission in synchronism with the transmitting terminal. The interconnected triggers operate through the medium of an oscillator driver whose frequency is determined by the data transmission rate of the system. The basic decision required to determine a need for a correction is made by investigating the state of the fourth trigger at the time of a data line shift. If the clock and the received data signals are exactly equal in duration and in phase synchronization, no correction is needed. If the fourth trigger is ON when a data line shift occurs, this indicates that the clock is out-of-phase and indicates the need to add a pulse. If the fourth trigger is OFF when the data line shift occurs, this indicates that the clock is out-of-phase and that a pulse is to be omitted from the clock.

This invention relates to a clock for generating timing pulses in a data transmission system, and more particularly to the improvements in the self-correcting controls designed to keep the receiving terminal of a data transmission system in synchronism with the transmitting terminal.

In data transmission systems which utilize signals having two states or conditions to encode the message for transmission, the transmitted information cannot be decoded correctly unless the timing circuits in the receiving terminal are closely synchronized with the timing circuits in the transmitting terminal. Since there are no synchronizing pulses in the transmitted signals, the receiving terminal must contain means for synchronizing its internal or local timing signals with the incoming coded signals. Such synchronized internal signals provide the timing signal for properly decoding the incoming message.

In the prior art, synchronization was performed in a signal synchronizer which compared the incoming signal to the receiver local timing signal and subtracted pulses from the local timing signal if the incoming signal was late with respect to the local timing signal, or added pulses to the local timing signal if the incoming signal was early with respect to the local timing signal. Prior art synchronizers frequently used a three level comparison for determining and identifying the time relation of the incoming signal relative to the local timing signals. It was subsequently found that a two level comparison apparatus was adequate and simpler in its structure to accomplish the same function. In such devices, the phase correction was based on having a clock which performed a binary countdown from a basic oscillator. This clock had the ability to either add, or subtract a drive pulse from the countdown. The clock ran at a frequency of approximately equal to the duration of a bit on the receiving data line. Corrections to compensate for the difference in the frequency were made by adding or subtracting a drive pulse as required with a decision to make a correction being made through the use of the second binary ring to count from the time of a data line shift to the time of a data strobe (a clock point nominally in the center of a received data bit). A count in the second ring indicated the need for a correction and the type of correction which was required.

In accordance with this invention, however, the self-correcting clock technique completely eliminates the need for the second binary ring. The clock itself is used directly to determine the time duration between a data strobe and a data line shift.

Accordingly, it is an object of the instant invention to provide a frequency correction system which enables remote data receiving terminals to remain continuously in synchronism with the transmitting terminal during a message transmission.

It is a further object of the instant invention to provide a self-correcting clock system which monitors the frequency difference between a transmitting and a receiving station and which initiates a correcting operation after sensing a frequency change.

It is a further object of the instant invention to provide a frequency correction system which is extremely accurate in sensing small deviations between the transmitted message rate and the receiving terminal.

It is also an important object of the invention to provide a self-correcting clock which is time controlled to place it in phase synchronism with the input signals.

Briefly, the instant invention comprises five interconnected triggers operating in modified binary fashion through the medium of an oscillator driver whose frequency is determined by the data transmission rate of the system. The basic decision required to determine the need for a correction is made by investigating the state of the fourth trigger at the time of a data line shift. If the clock and the received data signals are exactly equal in duration and in phase synchronization, then the fourth trigger will turn on at the same instant that the data line shifts and will turn off at the midpoint at the data bit. The data strobe occurs at the center of the data bit. If the fourth trigger is on when a data line shift occurs, this indicates that the clock is out of phase with respect to the data bit and indicates the need to add a pulse with a correction being made through appropriate control circuitry. If the fourth trigger is off when a data line shift occurs, this indicates that the clock is out of phase with respect to the received data bit and that a pulse is to be omitted from the clock.

The foregoing and other objects, features and advantages of the invention will be apparent from the following more particular description of a preferred embodiment of the invention as illustrated in the accompanying drawings.

Figure 1:
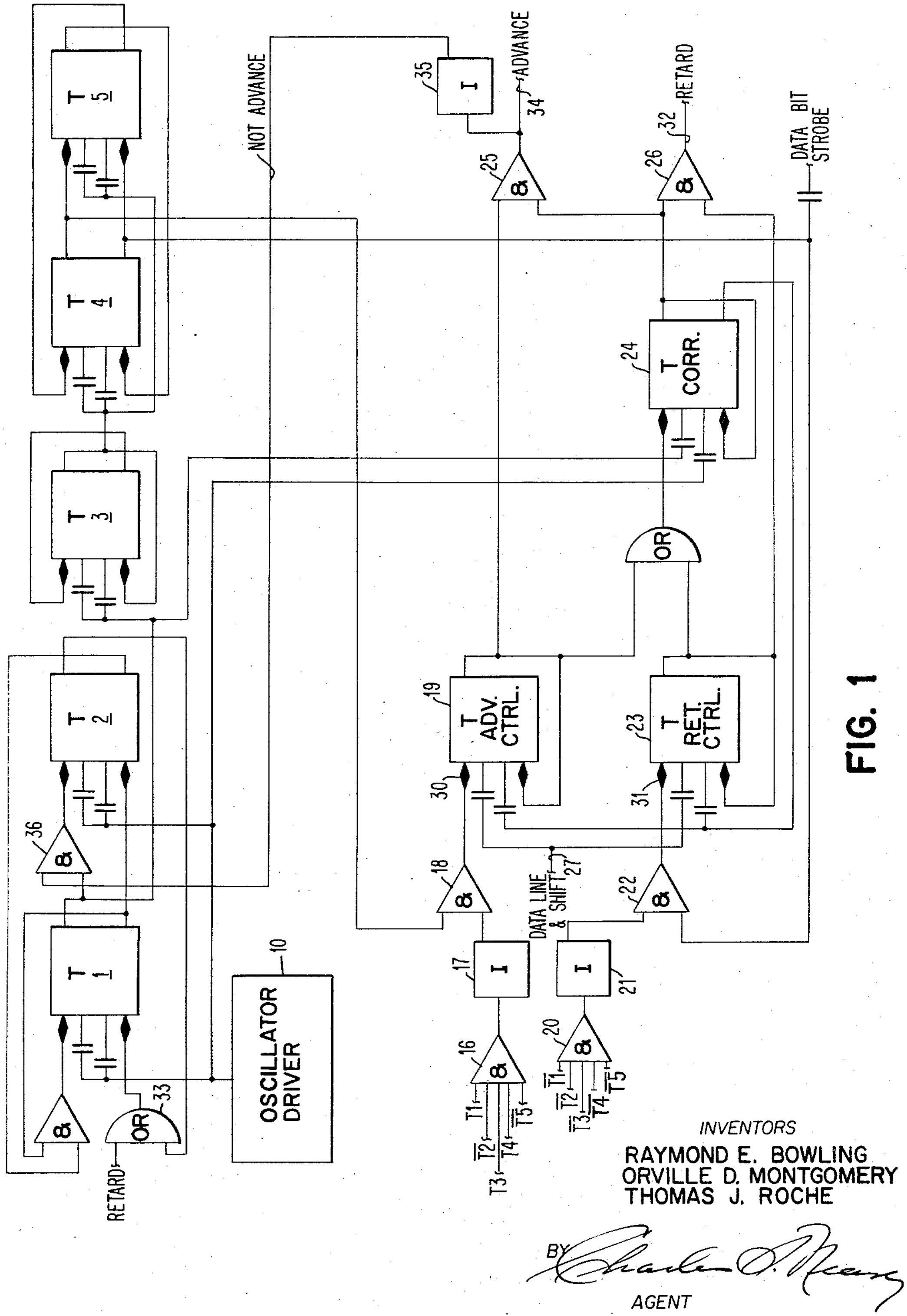
FIG. 1 is a schematic block diagram of the circuitry particularly suitable for exemplifying the subject invention.

With reference to FIG. 1, a train of pulse signals are fed from the oscillator driver 10 to a counter-like configuration comprising the triggers 1 through 5, inclusive. The frequency of the oscillator driver 10 is determined from the character transmission rate of the data transmission system and in such a manner that there will theoretically be 32 clock pulses for each data bit. For example, for a data transmission rate of one thousand baud (a unit of signalling speed in data transmission equal to the number of bits per second) the frequency of the oscillator driver 10 should be 32 kc. and for a 1200 baud rate the frequency should be 38.4 kc. Other speeds of transmission can be accommodated in a similar manner.

The triggers as depicted in FIG. 1 have the inputs applied to the left side with outputs occurring from the right side. The gate inputs are represented by diamond symbols and the triggering inputs are represented by the capacitive type symbols. A positive gate at either the upper (ON side) or the lower (OFF side) will render the trigger conditioned for triggering by a capacitively coupled triggering input pulse. With the trigger in an ON condition, a positive level voltage will occur at the upper right output and a negative level voltage will occur at the lower right output. This output condition will be reversed when the trigger is switched to its OFF condition.

The outputs from the triggers 1 through 5 are applied to the AND circuit 16 with the output therefrom applied through inverter 17 to AND circuit 18 and serve as a control gate for the advance control trigger 19. Similarly, the outputs from the triggers 1 through 5 are applied to the AND circuit 20 with the output therefrom applied through inverter 21 to AND circuit 22 and serves to controllably gate the retard control trigger 23. The ON outputs from the advance control trigger 19 and the retard control trigger 23 serve as the gates for the correction trigger 24 and the AND circuits 25 and 26. An ON output from the correction trigger 24 applied to the AND switch 25 in coincidence with the ON output from the advance control trigger 19 will make an advance operation of the clock circuit effective. In a like manner an ON output from the correction trigger 24 applied to the AND switch 26 in coincidence with the ON output from the retard control trigger 23 will make a retard operation of the clock circuit effective. This will become more apparent as the description proceeds.

Figure 2:
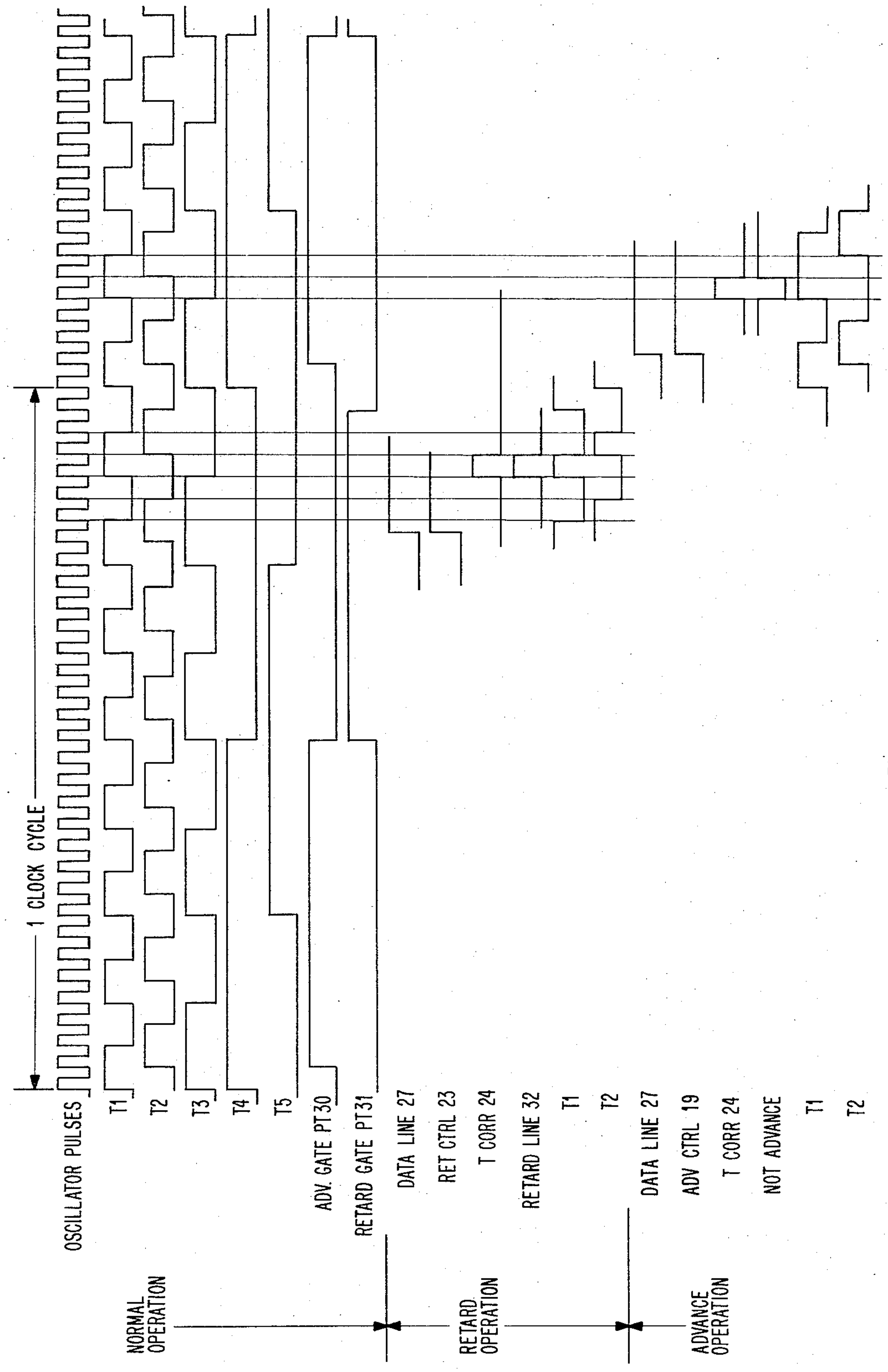
FIG. 2 is a set of timing diagrams illustrating the normal, advanced, and retard operations of the self-correcting clock circuitry shown in FIG. 1.

FIG. 2 shows the timing for normal operation, retard operation and advance operation. It may be noted that one clock cycle comprises 32 oscillator pulses and that the advance control gate at point 30 and the retard control gate at point 31 are each on for $^{15}/_{32}$ of a cycle. The remaining $^{2}/_{32}$ reside such that there will be $^{1}/_{32}$ on each side of a null point. In the normal operation, if the self correcting clock and the data lines are exactly equal in duration and in phase synchronization, the trigger 4 will turn ON at the same time that the data line shifts.

*Retard operation*

There is shown on FIG. 2 the timings which occur during a retard operation. With reference to FIG. 2, it may be noted that the data line 27 shifts to a mark or UP condition during the time that the retard gate at point 31 is in an UP condition. Consequently the retard control trigger 23 is turned to its ON condition and provides an UP gate to the ON side of the correction trigger 24 so that the subsequently occurring change of trigger 1 to its ON condition will cause the correction trigger 24 to turn to its ON condition. The coincident inputs to AND circuit 26 causes line 32 to be in an UP condition thereby passing through OR switch 33 and UP gating the OFF side of the trigger 1. The subsequently occurring oscillator drive pulse will cause the trigger 1 to be turned OFF thereby causing the trigger to be retardedly shifted from its normal operation and the triggers 1 through 5, inclusive, will become operative on a new time base.

*Advance operation*

An advance operation is shown in the timing diagrams of FIG. 2 such that a shift in the data line 27 to a mark or UP condition occurs during the time at which the advance gate at point 30 is in an UP condition. The data line 27 shift will cause the advance control trigger 19 to be turned to its ON condition thereby gating the ON side of correction trigger 24 so that the subsequently occurring ON output from trigger 1 will cause the correction trigger 24 to be turned to its ON condition. The coincident inputs to the AND switch 25 will cause a resultant output which causes the advance line 34 to be placed in an UP condition with the resultant output from the inverter 35 causing a not advance condition to be applied to the AND switch 36. The not advance condition which is applied to AND switch 36 prevents the ON side output from trigger 1 from being effective and gating the trigger 2 ON side. Consequently, this sequence of events causes the triggers T1 through T5, inclusive, to operate on a new time base as indicated by the timing diagrams.

In summary, there has been shown and described a unique and novel application of trigger circuits so as to provide a clock ring which in itself determines the need for correction and eliminates the need for a phase or second counter ring and its associated controls. Consequently, the circuitry of the instant invention accomplishes the clock correcting function with less circuitry and a higher degree of reliability and with lower cost.

While the invention has been particularly shown and described with reference to a preferred embodiment thereof, it will be understood by those skilled in the art that various changes in form and details may be made therein without departing from the spirit and scope of the invention.

What is claimed is:

1. In a self-correcting clock for a data transmission system, the combination comprising:

(a) a timing pulse source,
(b) a plurality of interconnected counting stages driven by said timing pulse source and having outputs therefrom,
(c) a data input line,
(d) clock advance control means responsive to the outputs of said counting stages and a positive going transition on said data input line, and
(e) clock correction means gated by said clock advance control means and made operative by a pulse from the first stage of said counting stages for selectively suppressing a timing pulse to thereby prevent its entering the counting stages and thereby effectively advancing the clock.

2. In a self-correcting clock for a data transmission system, the combination comprising:

(a) a timing pulse source,
(b) a plurality of interconnected counting stages driven by said timing pulse source and having outputs therefrom,
(c) a data input line,
(d) a clock retard control means responsive to the outputs of said counting stages and a positive going transmission on said data input line, and
(e) clock correction means gated by said clock retard control means and made operative by a pulse from the first stage of said counting stages for selectively adding a pulse to said counting stages and thereby effectively retarding the clock.

3. In a data transmission system, a self-correcting clock comprising:

(a) a drive pulse source,
(b) a binary counting array having a plurality of stages driven by said timing pulse source and having outputs therefrom,
(c) a data receiving line,
(d) a clock advance control means responsive to the outputs of said counting array and a positive going transition on said data receiving line,
(e) a clock retard control means responsive to the outputs of said counting array and a positive transition on said data receiving line, and
(f) clock correction means gated by said clock advance control means or said clock retard control means and made operative by a pulse from the first stage of said counting array for selectively adding a pulse into said counting array to retard the clock or suppressing a timing pulse and thereby preventing its entrance into said counting array to advance the clock.

4. In a data transmission system a self-correcting clock comprising:

(a) a source of clock pulse signals, (b) five intercoupled bistable counting triggers responsive to said source of clock pulse signals and having outputs therefrom,
(c) data receiving line, and
(d) clock advance and retard control means controlled by the outputs from the fourth stage of said counting triggers in conjunction with a positive going signal excursion on said data receiving line for selectively advancing or retarding said counting triggers.

5. In a self-correcting clock for a data transmission system, the improvements comprising:
(a) a source of clock pulse signals,
(b) five intercoupled bistable counting triggers coupled with and responsive to said pulse signals and having outputs therefrom,
(c) a data signal input line,
(d) a clock advance control trigger responsive to the outputs of said counting triggers and with the fourth trigger in an ON condition and a positive going transition on said signal input line, and
(e) a bistable correction trigger gated by the clock advance control means and made operative by an output pulse from the first stage of said counting triggers for suppressing a pulse thereby preventing its entrance into the counting triggers and effectively advancing the clock.

6. In a self-correcting clock for a data transmission system, the improvements comprising:
(a) a source of clock pulse signals,
(b) five intercoupled bistable counting triggers coupled with and responsive to said pulse signals and having outputs therefrom,
(c) a data signal input line,
(d) a clock retard control means responsive to the outputs of said counting triggers with the fourth trigger in an OFF condition and a positive going transition on said signal input line, and
(e) a bistable correction trigger gated by the clock retard control means and made operative by an output pulse from the first stage of said counting trigger for selectively adding a pulse into the counting triggers and effectively retarding the clock.

7. In a self-correcting clock for a data transmission system, the improvements comprising:
(a) a source of clock pulse signals,
(b) five intercoupled bistable counting triggers coupled with and responsive to said pulse signals and having outputs therefrom,
(c) a data signal input line,
(d) a clock advance control trigger responsive to the outputs of said counting triggers and with the fourth trigger in an ON condition and a positive going transition on said signal input line,
(e) a clock retard control means responsive to the outputs of said counting triggers with the fourth trigger in an OFF condition and a positive going transition on said signal input line, and
(f) a bistable correction trigger gated by the clock advance control means or the clock retard control means and made operative by an output pulse from the first stage of said counting triggers for selectively adding a pulse into the counting triggers or suppressing a pulse thereby preventing its entrance into the counting triggers.

References Cited

UNITED STATES PATENTS

| | | | |
|---|---|---|---|
| 3,141,930 | 7/1964 | Krause | 178—69.5 |
| 3,147,342 | 9/1964 | Chojnowski et al. | 178—69.5 XR |
| 3,185,963 | 5/1965 | Peterson et al. | 178—69.5 XR |
| 3,209,265 | 9/1965 | Baker et al. | 328—63 |

ARTHUR GAUSS, *Primary Examiner.*

S. D. MILLER, *Assistant Examiner.*